United States Patent

Friedel

[15] 3,665,825
[45] May 30, 1972

[54] FILM FONT CASSETTE

[72] Inventor: Murray Friedel, North Miami Beach, Fla.
[73] Assignee: Visual Graphics Corporation
[22] Filed: Apr. 17, 1970
[21] Appl. No.: 29,402

[52] U.S. Cl.................................................95/4.5
[51] Int. Cl..........................................B41b 17/26
[58] Field of Search......................................95/4.5

[56] References Cited

UNITED STATES PATENTS

| | | | |
|---|---|---|---|
| 2,257,424 | 9/1941 | Meyer | 95/31 |
| 2,762,277 | 9/1956 | McChesney | 95/4.5 |

*Primary Examiner*—John M. Horan
*Attorney*—Ernest H. Schmidt

[57] ABSTRACT

A film font cassette for optically projecting, selectively, film font images for use in phototypographic composition equipment is described. A film strip having type character images printed in fonts of the type is rollably supported between a pair of reels within each side of the cassette and moveable past a central projection window. The reels include gear means at the bottom of the cassette interengageable with reel-turning mechanism in the equipment with which the cassette is to be used for selectively moving a film image into projecting position within the cassette projection window. Guide mechanism within the cassette and cooperative with indexing means on the equipment with which the cassette is to be used effects precise registration of the film and its image to be projected with the optical system of the equipment.

7 Claims, 5 Drawing Figures

Patented May 30, 1972

INVENTOR.
MURRAY FRIEDEL.
BY Ernest H. Schmidt,
atty.

Patented May 30, 1972

INVENTOR.
MURRAY FRIEDEL.
BY Ernest H. Schmidt,
atty.

Patented May 30, 1972

INVENTOR.
MURRAY FRIEDEL.
BY Ernest H. Schmidt,
atty.

FILM FONT CASSETTE

This invention relates to phototypographic composition equipment and is directed particularly to an improved film font cassette for use with such equipment.

In applicant's U.S. Pat. No. 3,286,608 issued Nov. 22, 1966, and titled Photographic Type Printing Device there is described equipment for phtographically printing and arranging type or other graphic images on strips of photographic paper or film for use in graphic composition. In such phototypographic com-position equipment type images printed in "fonts" of the type along movable film strips are used to successively optically project individual font letters on the graphic composition photosensitive strip material to produce the required copy. Such film font strips are housed in cassettes having provision for winding of the font strip past an image projection window for the projection of any selected image of the film strip font.

Film font cassettes of the character above described which have been heretofore devised have been found to be deficient in various respects, principally in that they permit the infiltration of dust, resulting in lack of image clarity and spotting of the film and consequently the projected and printed image. Other deficiencies of film font cassettes such as have heretofore been devised are backlash in the font film drive mechanism causing image alignment problems, and drive mechanism interengagement difficulties between the cassettes and their associated phtotypographic composition equipment resulting in lost time while changing cassettes for mixing font styles, and difficulties in vertical positioning of the font film.

Another deficiency of prior cassettes is that they make no provision for texture-screening techniques (benday, half-tone, etc.). To overcome this lack, such texture-screening techniques were built into the design of the associated phototypographic equipment.

It is, accordingly, the principal object of this invention to provide a new film font cassette incorporating novel features which obviate the aforementioned difficulties and deficiencies by the provision of improved driving and mechanical interconnection means for the control of font motion and by the provision of means for texture screening built into the cassette itself.

A more particular object of the invention is to provide a film font cassette of the above nature which can be inexpensively fabricated by injection molding techniques and which comprises a housing including wind-up reels providing means for attaching the opposite ends of the film font strip in such a manner as to permit free or floating movement thereof in the direction of the axes of rotation of the reels.

Yet another object of the invention is to provide guide mechanism for the film font strip in its movement past the projection window, cooperative with film strip indexing mechanism on the equipment with which the cassette is to be used, for insuring positive registration of a selected font image with the optical system of the equipment so that every font film strip of various cassettes to be used will project images at precisely the same elevation in the equipment.

Other objects, features and advantages of the invention will be apparent from the following description when read with reference to the accompanying drawings. In the drawings, wherein like reference numerals denote corresponding parts throughout the several views.

Figure 1:
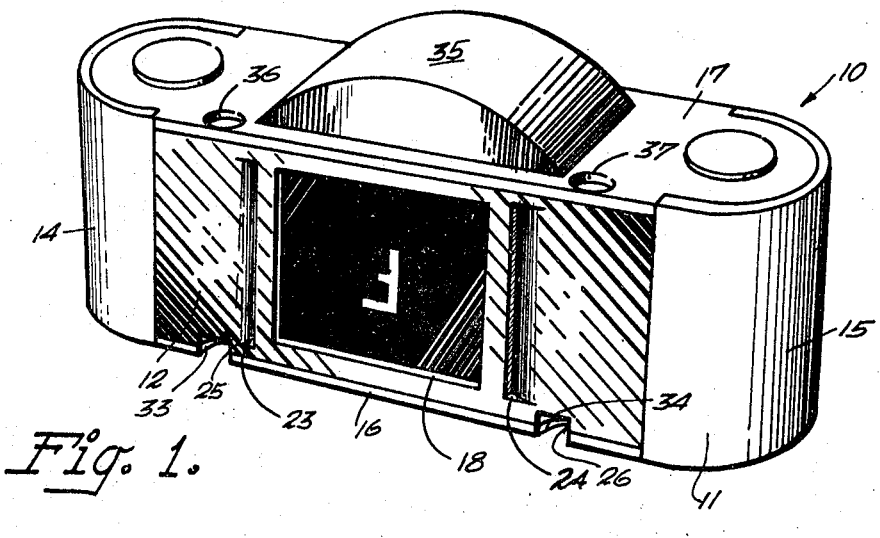
FIG. 1 is an oblique elevational view of a film font cassette embodying the invention.

Referring now in detail to the drawings, reference numeral 10 in FIG. 1 designates, generally, a preferred form of film font cassette embodying the invention. Although the cassette construction herein disclosed is particularly well-suited to the optical projection of film font characters upon photo-sensitive materials in a photographic printing device or phototypositor such as is disclosed in applicant's above-described U.S. Pat., it is to be understood that it is as well adapted to use in all instances wherein optical projection, successively and selectively, of film font characters is required.

The film font cassette 10 comprises a housing structure 11 comprised of interfitted parts including substantially flat, rectangular front and rear wall portions 12 and 13, respectively, arcuate end walls 14 and 15, substantially flat bottom wall 16 and top wall 17, all of which are preferably integrally molded of a strong synthetic plastic material.

Figure 3:
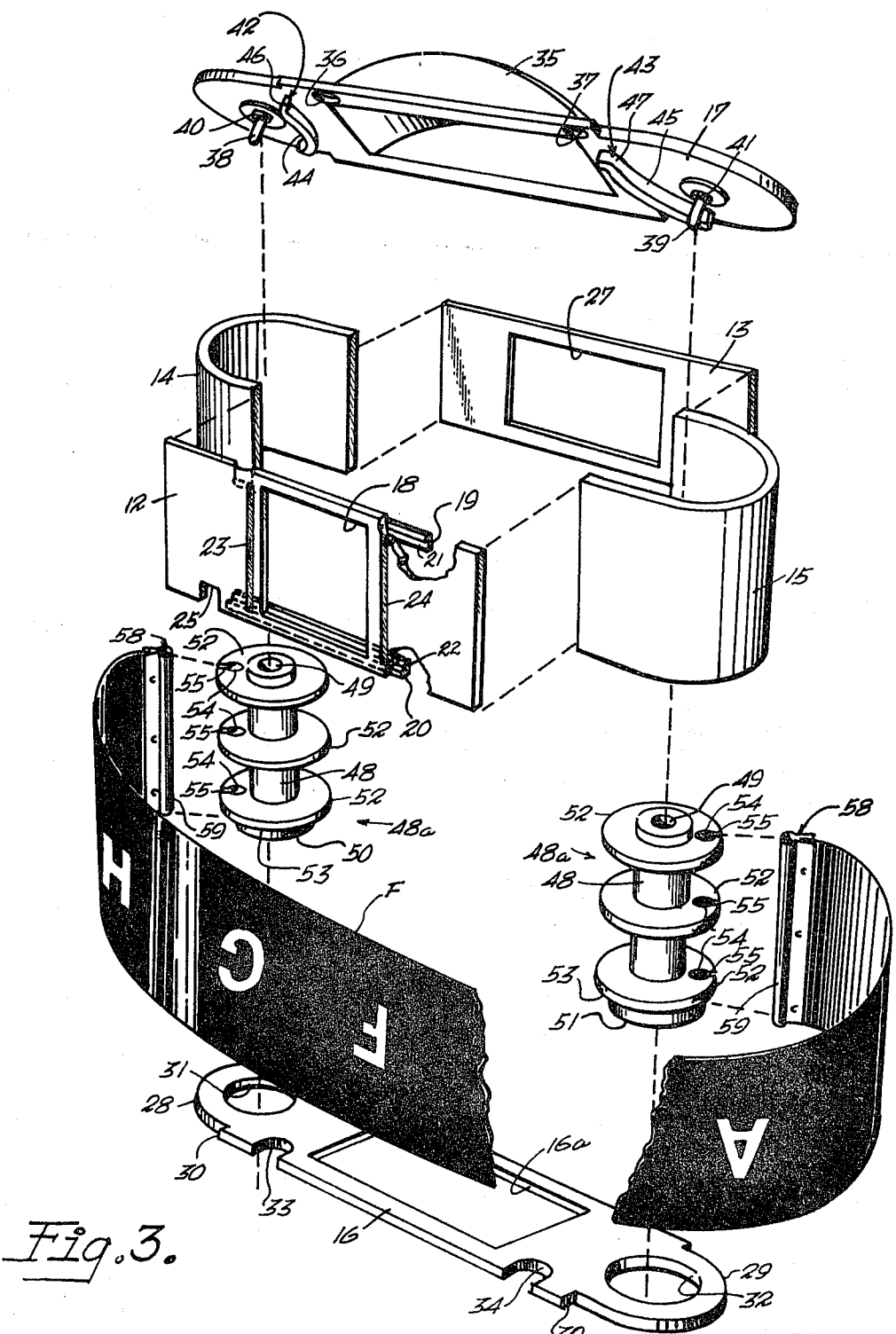
FIG. 3 is an "exploded" view of the film cassette, illustrating various mechanical details thereof.
Figure 5:
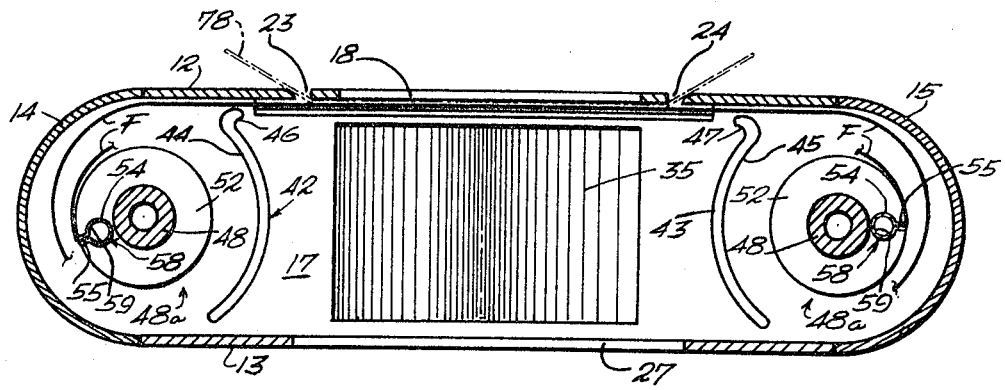
FIG. 5 is a horizontal cross-sectional view of the cassette taken along the line 5—5 thereof in FIG. 4, in the direction of the arrows.

The font wall portion 12 is provided with a centrally located, substantially rectangular film opening or window 18 along the upper and lower marginal edge portions whereof, at the inside, are affixed upper and lower longitudinal film guides 19 and 20, respectively. The film guides 19 and 20 are of right-angular cross-section and are so cemented or otherwise affixed in place, as illustrated in FIGS. 3 and 5, as to define upper and lower track grooves 21 and 22, respectively, along the upper and lower marginal portions of the rectangular film window 18 for guiding a film font strip F past said opening as is hereinafter more particularly described. The longitudinal film guides 19 and 20 can also be fabricated of a synthetic plastic material, cemented in place against inside portions of the rectangular front wall 12. Opposed, vertically extending slots 23 and 24 are provided in the front wall 12 at each side of the film opening or window 18, for the purpose hereinafter appearing. Rectangular recesses 25, 26 are provided in the lower edge of the front wall 12, in spaced relation to each side of the film opening or window 18.

The housing structure rear wall 13 is formed with a centrally located, horizontally extending rectangular light-passage opening 27, for the purpose hereinafter appearing.

The flat bottom wall 16 is formed with opposed arcuate end portions 28, 29, centrally located at each end and having an outer diameter somewhat less than the width of the central portion of said bottom wall to define therewith a pair of opposed shoulders 30 at each end. Circular drive reel openings 31 and 32 are also provided at each end of the bottom wall 16, said openings being concentric in their respective end portions 28 and 29. The bottom wall 16 along the front edge thereof is provided with opposed, symmetrically spaced arcuate locating recesses 33 and 34, and is also provided with a central rectangular opening 16a, all for the purposes hereinafter appearing.

The top wall 17, in its peripheral configuration and size, is identical to that of the bottom wall 16, with the exception of lacking the arcuate recesses 33 and 34 of said bottom wall. The top wall 17 is also formed with a sidewardly extending, centrally disposed arcuate dome 35 defining a cavity in the underside for the purpose hereinafter appearing. Opposed, circular film strip index openings 36 and 37 are provided in symmetrically spaced relation along the front marginal portion of the top wall 17, just outwardly of the ends of the upper film guide 19. The top wall 17 is also provided with laterally opposed, downwardly extending reel journalling upper pins 38 and 39, concentric with the respective arcuate outer edge portions of said top wall, said journalling pins, at their bases, extending from shallow, circular, circumjacently disposed projections 40, 41, respectively, in said top wall. The top wall 17 is also integrally formed, in its underside and near each end, with opposed, S-curve guide track projections 42 and 43 defining concave arcuate surface portions 44 and 45 substantially concentric with the axes of their respective journal pins 38 and 39, which arcuate surface portions terminate in spaced relation near the front edge of said top wall in short, reversely directed arcuate wall portions 46 and 47, the ends of which, as is best illustrated in FIG. 5, terminate in laterally spaced relation with respect to the ends of the upper longitudinal film guide 19 in the assembled cassette.

The film font cassette 10 further comprises a pair of laterally spaced, longitudinally extending font film reels 48a, also preferably integrally molded of a tough synthetic plastic material, each of which is formed with a central cylindrical spindle 48 having an axial journal pin opening 49 at the upper end. The spools 48 are provided at their lower ends with increased-diameter journal end portions 50 and 51 rotatably receivable in the drive reel opening 31 and 32, respectively, of the housing bottom wall 16 upon assembly of the cassette, as is hereinbelow more particularly described. The film reels 48 are formed along their lengths with three equidistantly spaced spacer disc portions 52, the lower one of which, as illustrated in FIG. 3, abuts against its respective lower end journal portion 50, 51, respectively, to define therewith an annular shoulder 53. The annular shoulders 53 provide thrust bearing surfaces for their respective film reels when assembled in journalling relation within the respective drive reel openings 31 and 32 in the bottom wall 16. The spacer disc portions 52 of the film reels 48a are formed, near their outer edges, with vertically aligned, circular openings 54 opening to the outer edges of said circular openings through entrance slots 55, said circular openings and their respective entrance slots defining key-hole shaped openings for the purpose hereinafter appearing.

Figure 4:
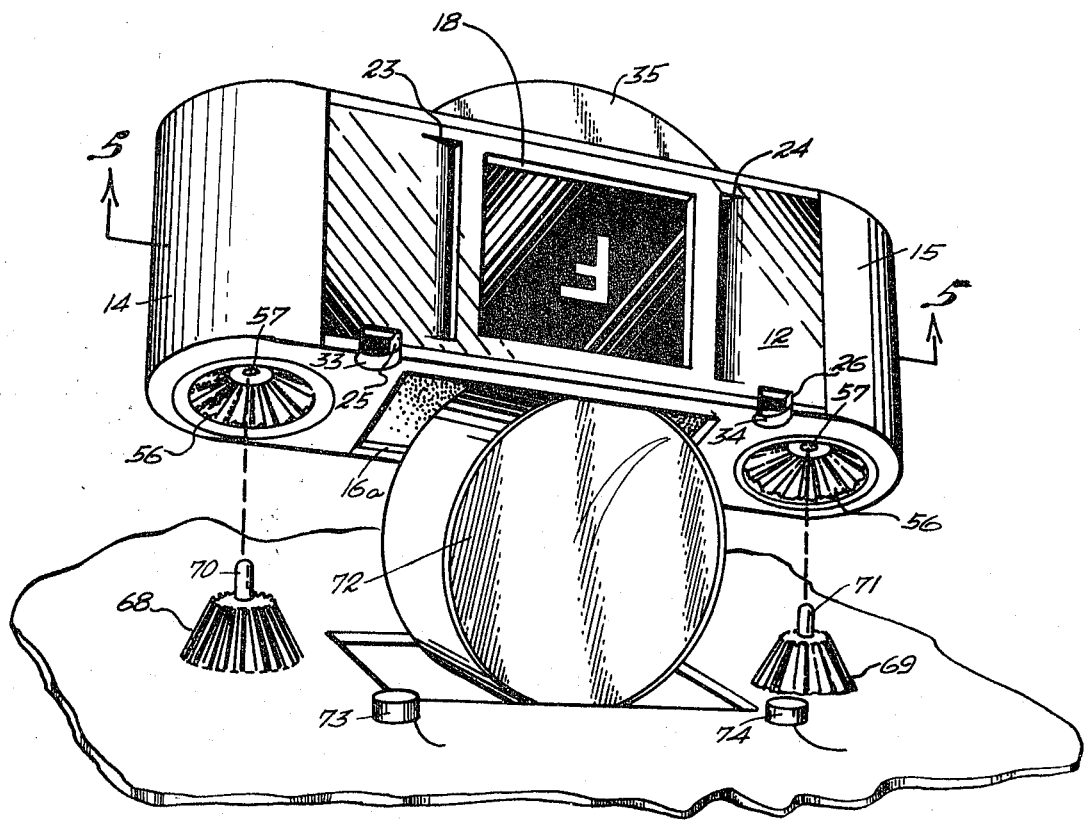
FIG. 4 illustrates, in oblique font elevation, the interengaging film font drive mechanism between the cassette and the associated phtotypographic equipment.

As best illustrated in FIG. 4, the underside of each of the increased diameter journal end portions 50 and 51 of the film reels 48a is integrally formed with a central female bevel gear 56, the bottom of which is provided with a central, axially extending locating pin opening 57.

As a means for attaching the ends of the font film F to their respective film reels 48a, 48a so that the film can be wound or reeled back and forth between said reels in the use of the cassette, as is hereinbefore more particularly described, said font film strip ends have transversely secured therealong respective preformed metal end strips 58, 58 having transverse rounded bead portions 59, 59. The bead portions 59 of the film end strips 58 are of such size and configuration as to be slidingly received, endwisely, within the aligned openings 54 of their respective reels. It is to be noted that the film ends, while being securely attached to their respective reels upon assembly, are not constrained in their axial movement with respect to the reels so that the font film, in its passage between the upper and lower track grooves 21 and 22 behind the film opening or window 18, can automatically be freely positioned therebetween for proper alignment behind the film opening without such jamming or twisting as might otherwise occur if the film ends were constrained as to movement in the vertical direction.

In the assembly of the cassette, the various parts of the housing structure 11 will be interfitted as illustrated in FIGS. 1, 4 and 5 and preferably secured in tight interfitting engagement by use of a plastic sealant such as methylene chloride. Alternatively, the various housing parts, i. e., the front wall 12, the rear wall 13, the arcuate end walls 14 and 15, the bottom wall 16 and the top wall 17, could be securely assembled together by heat-sealing along the interfitting edges to provide a continuous weld or bond. It will be understood that prior to closure of the interfitted housing parts, the reels 48a, 48a, together with their associated attached film font strip F, will be interiorly assembled in place as described above and as illustrated in FIGS. 3 and 5. With reference to FIG. 5, it can be seen how the S-curved guide tracks 42 and 43 serve the dual purpose not only of providing smooth arcuate surface portions 44, 45 for concentrically guiding respective end portions of the film font strip F, but also, at their short, reversely directed arcuate portions 46 and 47, serve as guidance slots for smoothly directing the film strip to entrance zones at either end of the upper track groove 21. With such film guidance mechanism, and with the vertical freedom of the reel attached ends of the film strip, precise alignment of the film strip within the cassette film opening 18 can be attained by any film font character selected along the full length of the film strip, as is hereinbelow more particularly described.

Figure 2:
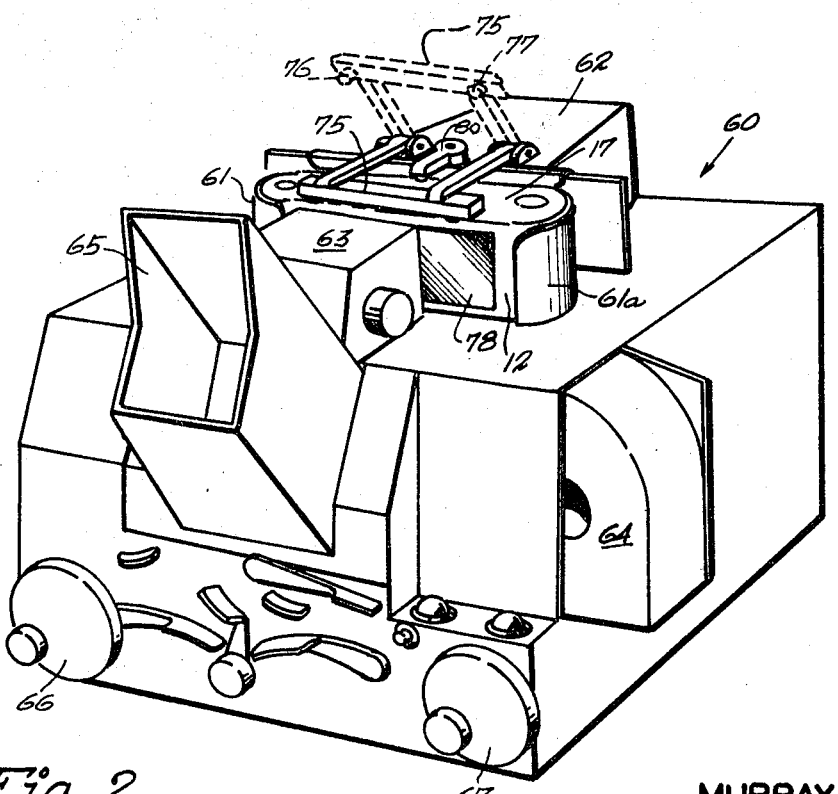
FIG. 2 is an oblique elevational view of a typical phototypographic composition equipment illustrating the film font cassette embodying the invention assembled thereto and the equipment mechanism by means of which it is indexed and secured in place.

FIG. 2 illustrates, by way of example, how the film cassette 10 is removably assembled to a typical photographic type printing device 60 of the type illustraed and described in applicant's above-mentioned U.S. Pat. No. 3,286,608. As illustrated in FIG. 2, the cassette 10 is received at each side between upstanding cassette guide members 61, 61a between a light source 62 at the rear of the equipment and an optical projection chamber 63 at the front of the equipment. The arrangement is such that the font image projected on graphic composition photo-sensitive strips supplied by a magazine 64 can be viewed through the equipment observation hood 65. Back-and-forth movement of the film font strip F for successive selection of the font character to be printed is effected by turning the hand wheels 66, 67, said hand wheels bring mechanically linked for turning respective male bevel drive gears 68 and 69, (see FIG. 4). As illustrated in FIG. 4, the male bevel gears 68, 69 are provided with central, upwardly extending locating pins 70, 71, respectively, adapted to be received within the central locating pin openings 57, 57 of the cassette bevel gears 56, 56 when the cassette is fitted in place as shown in FIG. 2. It will be understood that the bevel gears of the cassette and those of the photographic type printing device 60 will be of small pitch, that is, having many teeth, and of such design as to interfit with close tolerances so that backlash will be kept to a minimum.

As further illustrated in FIG. 4, the rectangular opening 16a in the bottom wall 16 of the cassette, together with concavity within the top wall 17 thereof afforded by the arcuate dome 35, provide a chamber within the cassette between the light passage opening 27 and the film opening or window 18 for the reception of a collimating lens 72 forming part of the optical system of the photographic type printing device 60. Locating pins 73, 74 on top of the device 60 have flat, horizontal upper surface portions adapted to be received freely within the locating recesses 33 and 34 to abut the lower edge of the film font strip F for vertically locating the strip with respect to the equipment and hence with respect to the optical system of the equipment. As illustrated in FIG. 2, as means for locating and guiding the upper edge of the film font strip F in its vertical position within the cassette opening or window 18, a weighted, vertically swingable press member 75 is provided, being journalled at the top of the light source housing 62 of the equipment 60. The press member 75 is provided, at its outer end, with spaced, downwardly extending locating pins 76, 77, loosely receivable, respectively, in the opposed, circular indexing openings 36, 37 in the cassette top wall 17 and having flat undersurfaces adapted to abut the upper edge of the film font strip F in cooperation with the above-described equipment-locating pins 73, 74 for vertically locating the strip. It will be understood that when inserting a cassette in place in the equipment 60, the swingable press member will first be lifted, as illustrated by the broken-line representation thereof in FIG. 2. As further illustrated in FIG. 2, the light source housing 62 of the equipment 60 also journals a laterally swingable hold-down lever 80, preferably equipped with a detent ball at its outer end, swingable into position over the top of an inserted cassette to retain it securely in place during use of the equipment.

The above-described vertical locating means for the film strip of a cassette assembled to the equipment 60, as illustrated in FIG. 2, positively vertically aligns the film strip portion appearing at the projection window with the optical system of the equipment to ensure precise indexing or locating, in the vertical direction, of characters of the same or different fonts with respect to their projected images.

FIG. 5 illustrates how a texture-screening film strip 78 can be slid in and out of the opposed vertical slots 23 and 24 in the cassette front wall 12 in front of the film strip to simulate benday, half-tone, etc. printing techniques, depending upon the overlay image presented by said strip, in the photographically projected image.

While I have illustrated and described herein only one form in which the invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure by Letters Patent is:

1. A film font cassette for use with photographic type printing equipment having a projection light source, an optical projection system, a film font drive mechanism and photosensitive strip material for reproducing film font images projected by the projection system, comprising, in combination, a housing structure having spaced front and back walls, a pair of end walls, and top and bottom walls, a film strip having type character images printed therealong for selective projection in a printing equipment, a pair of film strip reels rotatably journalled from top to bottom in opposite end portions of said housing structure, a film opening in said front wall, means connecting the ends of said film strip to one each of said reels to permit winding said film strip back and forth between one reel and the other, and means for guiding the film strip in closely spaced relation past the inside of said front wall film opening, the bottom ends of said reels extending through and being journalled in opposite openings in said bottom wall, said bottom ends of said reels each having separable interengagement means for rotatively drivingly interconnecting with the film font drive mechanism of said printing equipment when the film font cassette is interfittingly assembled with respect thereto, and a pair of opposed, vertically extending slots in said front wall, one at each side of said film opening, for removably receiving a texture-screening film strip.

2. A film font cassette as defined in claim 1, wherein said film strip ends connecting means comprises a circular opening extending along the length of each reel and having an entrance slot extending radially outwardly to open into the peripheral surface of the reel, and rounded bead members affixed transversely to the ends of said film strip, said rounded bead members being freely receivable, lengthwisely, in the circular openings of one each of said reels.

3. A film font cassette for use with photographic type printing equipment having a projection light source, an optical projection system, a film font drive mechanism and photosensitive strip material for reproducing film font images projected by the projection system, comprising, in combination, a housing structure having spaced front and back walls, a pair of end walls, and top and bottom walls, a film strip having type character images printed therealong for selective projection in a printing equipment, a pair of film strip reels rotatably journalled from top to bottom in opposite end portions of said housing structure, a film opening in said front wall, means connecting the ends of said film strip to one each of said reels to permit winding said film strip back and forth between one reel and the other, and means for guiding the film strip in closely spaced relation past the inside of said front wall film opening, the bottom ends of said reels extending through and being journalled in opposite openings in said bottom wall, said bottom ends of said reels each having separable interengagement means for rotatively drivingly interconnecting with the film font drive mechanism of said printing equipment when the film font cassette is interfittingly assembled with respect thereto, said film strip ends connecting means being operative to permit axial movement of the film strip ends with respect to their associated reels, said film strip guiding means comprising upper and lower facing grooves provided along respective upper and lower marginal portions of said film opening at the inside of said front wall, said film strip guide means further comprising a pair of S-curve guide track projections extending inwardly from said top wall and defining concave arcuate surface portions substantially concentric with the axis of rotation of their respective reels, said arcuate surface portions terminating in spaced relation near the front edge of said top wall in short, reversely directed arcuate wall portions, the ends of said arcuate wall portions terminating in laterally-spaced relation with respect to their respective ends of said upper facing groove.

4. A film font cassette for use with photographic type printing equipment having a projection light source, an optical projection system, a film font drive mechanism and photosensitive strip material for reproducing film font images projected by the projection system, comprising, in combination, a housing structure having spaced front and back walls, a pair of end walls, and top and bottom walls, a film strip having type character images printed therealong for selective projection in a printing equipment, a pair of film strip reels rotatably journalled from top to bottom in opposite end portions of said housing structure, a film opening in said front wall, means connecting the ends of said film strip to one each of said reels to permit winding said film strip back and forth between one reel and the other, and means for guiding the film strip in closely-spaced relation past the inside of said front wall film opening, the bottom ends of said reels extending through and being journalled in opposite openings in said bottom wall, said bottom ends of said reels each having separable interengagement means for rotatively drivingly interconnecting with the film font drive mechanism of said printing equipment with the film font cassette is interfittingly assembled with respect thereto, said film strip ends connecting means being operative to permit axial movement of the film strip ends with respect to their associated reels, said film strip guiding means comprising upper and lower facing grooves provided along respective upper and lower marginal portions of said film opening at the inside of said front wall, a light passage opening in said rear wall, a first pair of film locating openings in said bottom wall at each side of said film opening and in register with the guidance path of the lower edge of the film strip, a second pair of locating film openings in said top wall at each side of said film opening and in register with the guidance path of the upper edge of the film strip, said lower and upper locating opening pairs being adapted to receive upper and lower pairs of locating abutment pins of the printing equipment, when the cassette is assembled between the projection light source and the optical projection system thereof, for vertically indexing the film strip with respect to the equipment projection system.

5. A film font cassette as defined in claim 4, wherein the interengagement means at the bottom ends of said reels comprises female bevel gears.

6. A film font cassette as defined in claim 5, including a central opening in said bottom wall for receiving a collimating lens comprising the equipment to which the cassette is to be assembled.

7. A film font cassette as defined in claim 3, including a pair of opposed, vertically extending slots in said front wall, one at each side of said front wall opening, for removably receiving a texture-screening film strip.

* * * * *